June 7, 1966  WAY DONG WOO  3,255,440
METHOD AND APPARATUS FOR THE REPRODUCTION OF DATA AND TIMING SIGNALS
Filed Dec. 16, 1960  4 Sheets-Sheet 1

INVENTOR:
Way Dong Woo,
BY
Bair, Freeman & Molinare
ATTORNEYS.

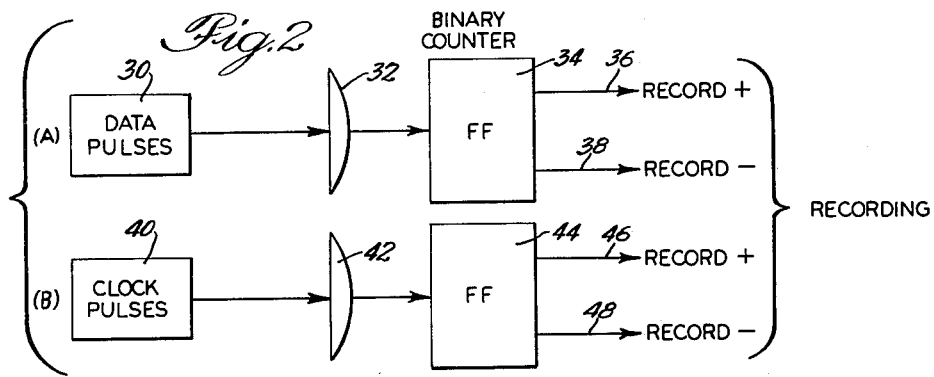
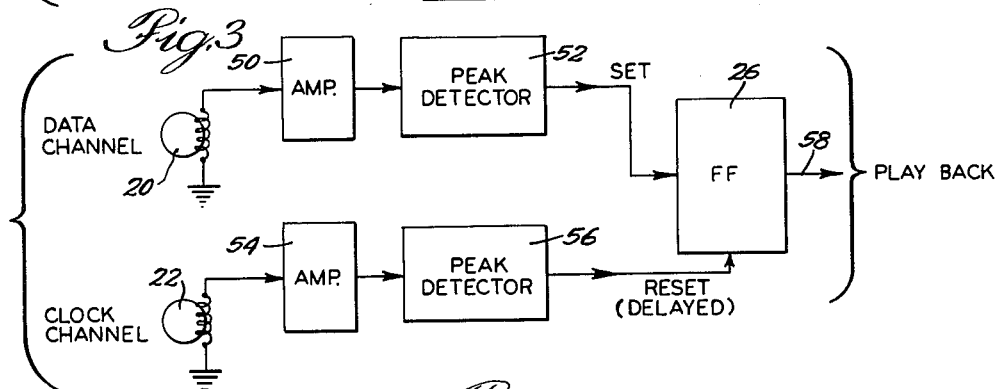
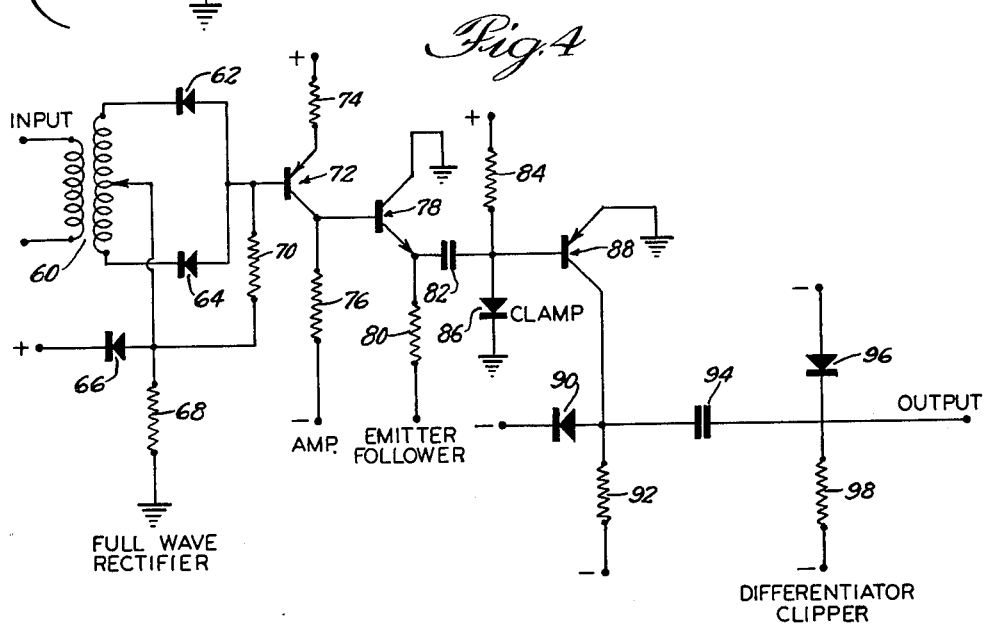
INVENTOR:
Way Dong Woo,
BY
Bair, Freeman & Molinare
ATTORNEYS.

Fig. 5
USE OF PEAK DETECTOR WITH STAGGERED CLOCK AND DATA PULSES
DATA PULSES  A
CLOCK PULSES  B
DATA PULSE WRITING CURRENT  C
CLOCK PULSE WRITING CURRENT  D
DATA PULSE CHANNEL PLAY BACK 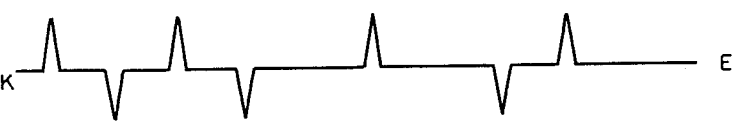 E
CLOCK CHANNEL PLAY BACK 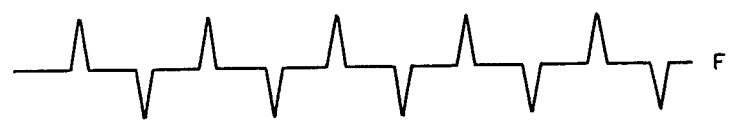 F
DATA CHANNEL PEAK DETECTOR  G
CLOCK CHANNEL PEAK DETECTOR  H

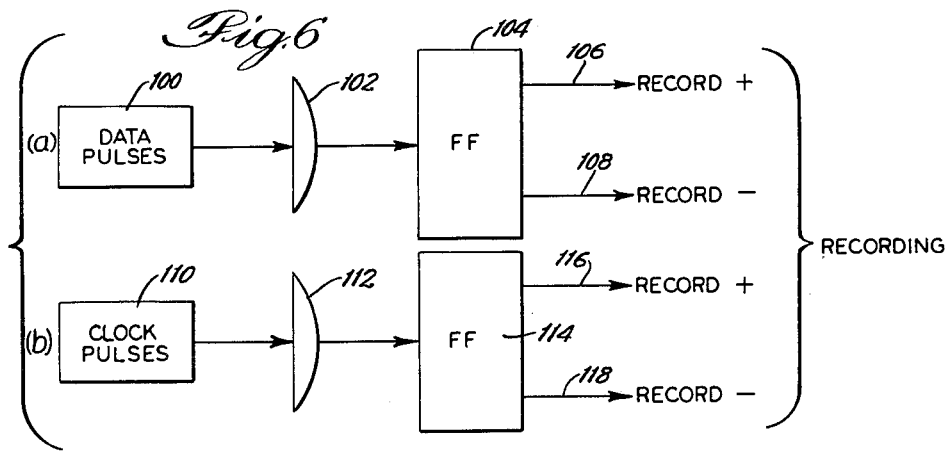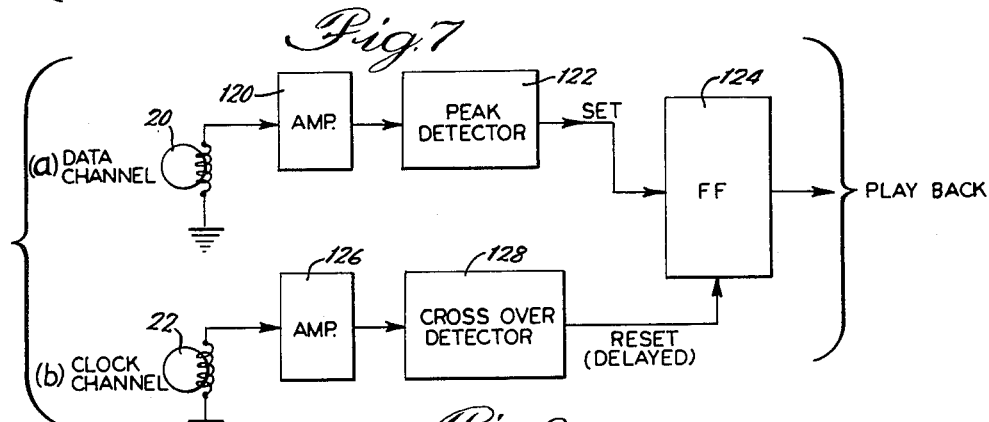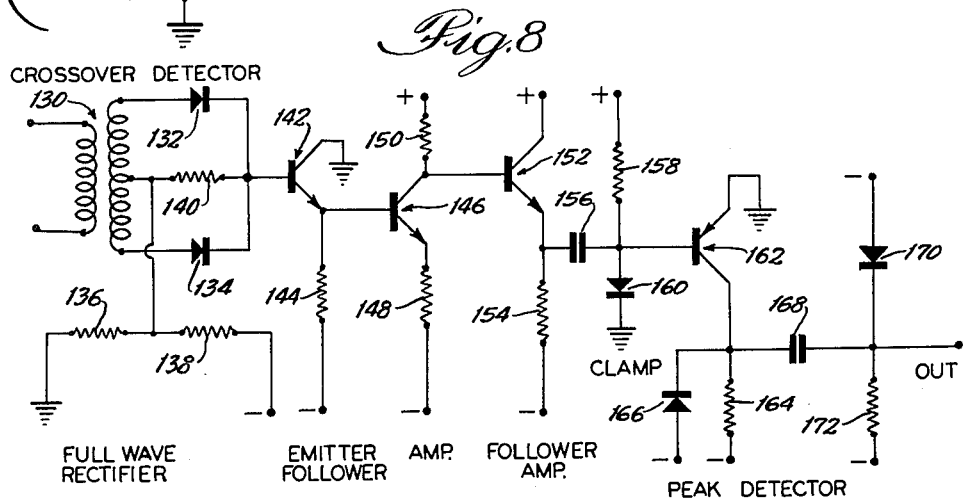

United States Patent Office 3,255,440
Patented June 7, 1966

3,255,440
METHOD AND APPARATUS FOR THE REPRODUCTION OF DATA AND TIMING SIGNALS
Way Dong Woo, Newton Center, Mass., assignor to Honeywell Inc., a corporation of Delaware
Filed Dec. 16, 1960, Ser. No. 76,351
7 Claims. (Cl. 340—174.1)

This invention relates generally to data processing systems, and more particularly to a new and improved method and apparatus for writing and reading information data signals utilizing a magnetizable record storage medium.

One general requirement of many data processing machines, such as computers and related types of data information handling systems, is that a relatively large amount of information be handled in a highly rapid and accurate manner. It is common in such systems for the information, in the form of discrete electrical signals, to be temporarily stored on a magnetizable record medium. Such a record medium may take the form of a cylindrical drum or elongated tape having a magnetizable surface upon which the information to be stored may be transferred. The information to be written upon or read from the magnetizable surface is transferred by means of an informational transfer head, relative to which the tape or drum is adapted to be moved. Generally, the magnetic tape or drum is driven past the transfer head at a relatively high predetermined speed in order to make an efficient transfer of the information between the magnetizable surface and the utilization circuits connected to the transfer head.

In accordance with a common practice in the art of data processing, the record storage member generally is provided with a number of separate channels or tracks for the respective storage of information and control signals. One such channel or track generally takes the form of a timing or clock channel on which a plurality of specifically timed pulses are written for timing the transfer of the information pulses.

Those skilled in the art will appreciate that serious problems have existed heretofore in those types of data processing systems wherein the information pulses are recorded simultaneously with the clock pulses on the magnetizable surface. These problems, which arise upon read-back of the recorded signals, may be created as a result of speed variations in the movement of the magnetizable medium, or as a result of skew in the case of magnetic tape storage devices.

Further, it has been found that such problems exist in proportion to the degree of pulse packing on the magnetizable surface, i.e., the number of pulses which are recorded on a given segment of the channel.

Heretofore, it has been convenient to provide signal delay apparatus in the read or play-back circuits of the data processing system to the end that the clock pulses read from the magnetizable surface be delayed a desired amount to enable all of the data pulses to be recovered during the play-back process. Thus, it has been a prior art practice to first find a clock pulse on the drum or tape and then to delay the clock pulse for a desired time to enable a corresponding information data pulse to be recovered and played back, if such a data pulse is recorded on the magnetizable surface.

This expedient of delay apparatus in the clock channel play-back circuit has not proved entirely satisfactory in modern-day electronic data processing systems, and particularly in such systems having high density recording and high speeds of operation. This condition has occurred because the use of clock delay circuits does not correct fully for speed variations in the record tape, because errors may arise in the delay circuits themselves, and because of the skew problem in high speed record tapes, all of which may result in a loss of information signals or in the reading of the wrong information signals due to too-late or too-early reading of the information pulses.

These serious problems are avoided in accordance with the features of the present invention wherein the use of the prior art delay apparatus in the clock pulse reading circuit is completely eliminated. In one particularly illustrative embodiment of the invention, described in detail below, the storage medium utilizes a clock channel which is fixedly displaced in phase from the information channel when the clock and data pulses are recorded on the magnetic tape. Several highly desirable advantages are obtained by the provision of an off-set or advanced phased clock channel of the type taught by this invention. First, the utilization circuitry does not require any delay circuits which would otherwise be required in appropriately gating the clock signals with the information signals. By the elimination of the delay circuits required in prior art systems, the invention has eliminated the restrictive effect of tolerances on the ability of the system to read the data signals.

A further particular advantage achieved is the elimination of speed variation errors in the reading operation since the tape speed is no longer directly related to a fixed delay circuit associated with the reading circuits. In other words, those skilled in the art will readily appreciate that the amount of delay between the clock pulse and the information pulse in this new system will be dependent solely upon the amount that the clock pulse is off-set from the information pulse, and this means that tape speed variations will not affect the accuracy and efficiency of the system.

Another advantage achieved by this invention is the improved ability of the system to withstand skew. This desirable effect is achieved, due to the fact that the tolerances of a delay circuit are not present to adversely affect the timing of the clock pulse and the information pulse play-back.

The recording and play-back system of the present invention has the further advantage in that the packing density of the system is considerably higher than can be tolerated in prior art recording and play-back systems. The invention permits the use of a wider recording gap on the recording head and futher, results in a system which is less pattern-sensitive than the prior art devices. It further has the advantage of providing a system capable of responding to recorded signals under conditions where higher dirt particle sizes are present. Thus, the system's resolution is improved since the latter is a factor of the ability of the system to withstand certain particle or dirt sizes on the magnetic tape without causing drop-out or fading of the signals below a predetermined tolerance level.

Accordingly, it is a general object of this invention to provide a new and improved method and apparatus for writing and reading information data signals utilizing a magnetizable record storage medium.

It is a more particularly advantage of this invention to provide such a new and improved method and apparatus which is more efficient and more accurate than the prior art data processing systems of this general type.

It is a further object of this invention to provide a new data processing system for use with a magnetizable record medium wherein the clock pulses are recorded on a clock channel so as to be off-set or physically displaced-in-phase with respect to the information pulses recorded on the information channels on a magnetizable record medium.

It is a still further object of this invention to provide an improved method and means for recording the clock pulses on a magnetizable record medium approximately one-half pulse period after the corresponding data pulses are recorded in the information channels of the record medium such that, upon play-back, the sampling of the information pulses occurs at a time which insures the detection of the information pulses, if any exist.

It is another object of this invention to provide a new method and means for causing the recording of the clock pulses upon a magnetizable record medium to be off-set or staggered-in-phase with respect to the recording of the information pulses such that upon play-back the peaks of the information pulses, if any, may be sensed at a time which insures their detection.

It is still another object of this invention to provide a new and improved method and means for recording and play-back of the clock and information pulses in their respective channels upon a magnetizable record medium in which the clock pulses and the information pulses are recorded simultaneously, and upon play-back each of the clock pulses is sensed for its cross-over point to detect the presence or absence of a corresponding information pulse, said clock pulse cross-over point occurring at approximately the middle of the corresponding information pulse when the latter is present.

Further objects and advantages of this invention will become apparent as the following description proceeds, and the features of novelty which characterize this invention will be pointed out with particularity in the claims annexed to and forming a part of this specification. For illustrative examples of preferred embodiments of this invention, reference is made to the accompanying drawing, in which:

FIGURE 2 is a block schematic diagram of one illustrative embodiment of recording circuit which may be utilized in the off-set or staggered recording of the information and clock pulses upon the magnetizable record medium;

FIGURE 3 is a block schematic diagram of one illustrative embodiment of the play-back circuit which may be used to recover the staggered or off-set information signals recorded by the circuit of FIGURE 2;

FIGURE 4 is a schematic circuit diagram of one illustrative embodiment of peak detector circuit which is embodied in the play-back circuit of FIGURE 3;

FIGURE 5 is a composite diagrammatic showing of the waveforms of signals appearing in one illustrative embodiment of the invention wherein the information and clock pulses are recorded in staggered or off-set phase relationship and wherein a peak detector is used for the sensing of the information signals upon playback;

FIGURE 6 is a block diagram illustration of the recording or writing circuit in the embodiment of the invention utilizing simultaneous recording and cross-over detector;

FIGURE 7 is a block schematic diagram of the play-back circuits in the embodiment of the invention utilizing simultaneous recording and a cross-over detector;

Figure 9:
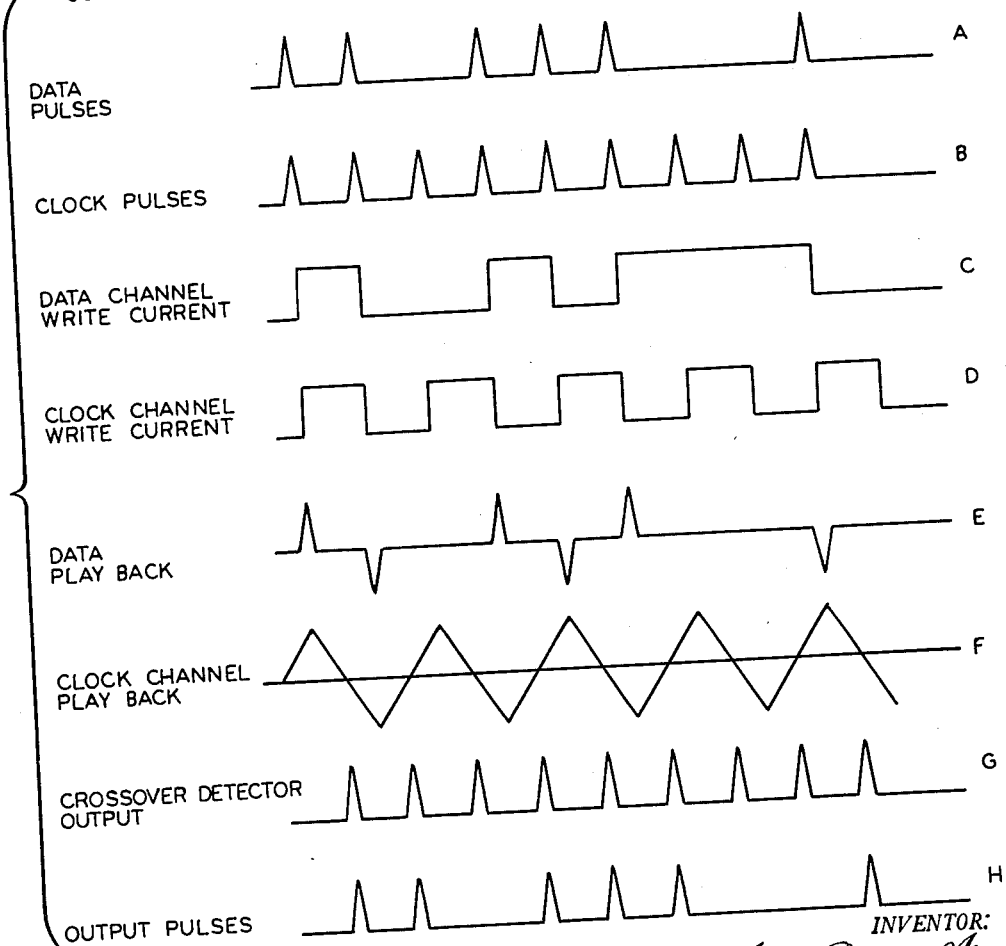

FIGURE 8 is a schematic circuit diagram of one illustrative embodiment of cross-over detector circuit embodied in the invention; and FIGURE 9 is a composite diagrammatic showing of the waveforms of signals appearing in one illustrative embodiment of the invention wherein the information and clock pulses are recorded in phase and wherein the information pulses are detected upon play-back with the use of cross-over detector.

Figure 1:
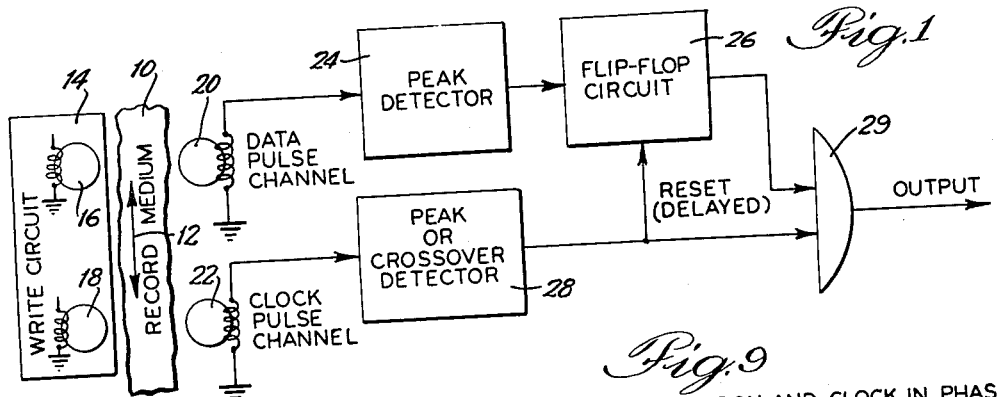
FIGURE 1 is a block diagram schematic drawing illustrating the principles of the present invention.

Referring now to the drawing, and more particularly to FIGURE 1 thereof, there is illustrated in block diagrammatic form a data processing system of a type embodying the present invention. It is contemplated in this illustrative embodiment that a dynamically operated storage medium will be used for the storage of data and clock signal pulses. Those skilled in the art of data processing appreciate that such a dynamically operated storage medium may take the form of a rotatable magnetic drum or a transportable, elongated magnetic tape, each comprising a magnetizable surface for the storage of the signal pulses thereon.

In the illustrative embodiment of FIGURE 1, the record medium having a magnetizable surface is identified by the reference numeral 10, with the arrows 12 indicating that the record medium is movable relative to a plurality of magnetic writing heads and reading heads. In accordance with a well-known technique, the record medium 10 may be provided with a plurality of independent signal channels, such as a data pulse channel and a clock or timing pulse channel. As shown in FIGURE 1, the writing circuit 14, which may take any suitable form of magnetic recording circuit known in the art, comprises at least a pair of magnetic writing heads 16 and 18. The magnetic head 16 serves to record the information data pulses in a data pulse channel on the record medium 10 and the magnetic writing head 18 serves to record the timing or clock pulses in a clock channel of the record medium 10.

Reading of the signal pulses recorded on the record medium 10 is effected by a plurality of magnetic pick-up heads, illustratively indicated at 20 and 22 of FIGURE 1. The magnetic pick-up head 20 is connected in a data pulse network wherein data pulses recorded on the record medium 10 are sensed by the pick-up head 20 and are transmitted to the remainder of the data pulse network for further processing. The magnetic pick-up head 22 is connected in a clock pulse network wherein the timing or clock pulses recorded on the clock channel of record medium 10 are sensed by the pick-up head 22 and are transmitted to the remainder of the clock pulse network for a further control function.

In accordance with a specific feature of this invention, explained in greater detail hereinbelow, the data pulse and clock pulse networks serve to insure that each data pulse recorded on the record medium will be detected, and that no data pulse signal will be lost due to undesirable factors such as tape speed variations and tape skew. This highly advantageous result is achieved by the provision of a peak detector 24 connected to the output of the data pulse pick-up head 20 and having its output, in turn, connected to an input of a bistable circuit 26 which may take the form of a suitable flip-flop circuit or bistable counter of any type well known in the art. In the operation of the invention, a data pulse sensed by magnetic pick-up head 20 is suitably amplified and passed to the peak detector 24. The peak detector provides an output pulse corresponding to the peak of the sensed data pulse which sets the bistable circuit or flip-flop into one of its stable states of operation.

The magnetic pick-up head 22 senses the clock pulses recorded on the clock channel of the record medium 10 and these pulses are transmitted to a peak or cross-over detector 28, which advantageously may take any one of the plurality of forms disclosed in greater detail hereinbelow. The delayed output of the peak or cross-over detector 28 is applied to reset the flip-flop circuit 26, such that an output pulse is provided on the output line of the system through a suitable gating device 29, such as a coincidence or AND gate.

Since such an output pulse will be present only when the flip-flop circuit 26 has first been set by a data pulse and then reset by a clock pulse, it is apparent that the timing relationships of the data pulses and clock pulses to the flip-flop 26 is of extreme importance to insure that all of the data pulses on the record medium 10 are recovered. In the prior art, it was necessary to utilize a delay circuit in the clock pulse network so that a clock pulse would arrive to reset the flip-flop circuit after a data pulse, if present, first set the flip-flop circuit. However, this prior art use of delay circuits in the clock pulse network gave rise to several potential errors due to the speed variations in the record medium, skew, or defects in the delay circuit itself. In accordance with the present invention, such prior art delay circuits have been entirely eliminated from the clock pulse network with the result that greater accuracy and efficiency of operation is achieved in such data processing systems.

Referring now to one specific illustrative embodiment of the invention, as shown in FIGURES 2 and 3 of the drawing, there is disclosed a recording and play-back system which is characterized by the staggered or off-set phase relationship of the data and clock pulses recorded on the record medium. FIGURE 2 discloses a writing circuit which conveniently may be used in the present invention. FIGURE 2(a) shows a data pulse source 30 which provides a series of data or information pulses at its output. These data pulses are transmitted through suitable buffer or amplifying means 32 to a binary counter flip-flop 34 which is adapted to be set into one or the other of its two stable states of operation in accordance with the characteristics of each data pulse. The output of the binary counter flip-flop 34 thus may be in the form of a positive signal current on the line 36 or a negative signal current on the line 38, depending upon the nature of the data pulse to be recorded. These signal currents are applied to a suitable magnetic writing or recording head, such as the magnetic head 16 shown in FIGURE 1, to effect the desired recording of the data pulses on the record medium 10.

Similarly, a number of clock pulses is provided from a clock pulse source 40, and these pulses are transmitted through suitable amplifying or buffer means 42 to the binary counter flip-flop 44. Binary counter flip-flop 44 is similar in operation to binary counter flip-flop 34 in that it is set to one or the other of its stable states of operation depending upon the nature of the clock pulses transmitted thereto. The output of the binary counter flip-flop 44 is in the form of a positive signal current on the output line 46 or a negative signal current on the output line 48, as determined by the state of the binary counter flip-flop 44, and this output is applied to a suitable clock pulse writing magnetic head such as the magnetic head 18 shown in the drawing.

In accordance with a feature of this embodiment of the invention, the data pulses and the clock pulses recorded on the record medium 10 by the magnetic writing heads are staggered or off-set in phase relative to each other. This may be accomplished in a number of different ways which suggest themselves to those skilled in the art, and one manner of providing such staggered phase recording would be delay the recording of the clock pulses before recording by a predetermined time period such that a pulse recorded by the data pulse writing head on the record medium would be physically advanced over a pulse recorded by the clock pulse writing head on the record medium.

In one advantageous embodiment of the invention, it is contemplated that the clock pulses will be recorded on the record medium approximately midway between successive data pulses when the latter represent binary ones recorded on the record medium. Thus, during recording, the clock pulses would be displaced an appropriate amount, such as a one-half pulse period, with respect to the recording of the corresponding data pulse so that when the data pulses are sampled by the reading network, the detection of all data pulses is ensured and there will be no loss of a data pulse or a reading of the wrong data pulse due to early or late sampling.

As illustrative circuit for reading the phase-staggered data and clock pulses from the record medium is shown in FIGURE 3 of the drawing. As there shown, the magnetic pick-up head 20 adjacent the data channel of the record medium senses each data pulse recorded thereon and transmits the sensed data pulses through a suitable amplifier 50 to a peak detector 52. The peak detector 52 provides an output upon sensing the peak of each data pulse to set the flip-flop 26 to one of its two stable states of operation. The clock pulses on the record medium are sensed by the magnetic pick-up head 22 approximately ½ pulse period after the corresponding data pulses—due to the staggered recording of these pulses on the record medium—and the clock pulses are transmitted through a suitable amplifier 54 to the peak detector 56. Peak detector 56 provides a delayed output responsive to the peak of each sensed clock pulse to reset the flip-flop 26. As a result, a pulse will appear on the output line 58 corresponding to the recorded data pulse for transmission to further utilization circuits.

Those skilled in the art can appreciate that since the clock pulses are delivered directly from the record medium, without an intervening delay circuit, these clock pulses may be considered to be slaves of the record medium, and any variation due to speed changes or skew effects of the tape will not adversely affect the accurate detection of the data pulses.

FIGURE 4 is an illustrative schematic diagram of one type of peak detector which may be used in the circuit of FIGURE 3. Advantageously, the peak detector may comprise an input transformer 60 having a primary winding connected to the output of a pulse amplifier and having a secondary winding forming a part of a full wave rectifier. A full wave rectifier comprises a pair of diodes 62 and 64 each connected to a different terminal of the transformer secondary winding and a center tap in the transformer secondary winding connected to the junction of a diode 66, resistor 68 and resistor 70.

The output of the full wave rectifier is applied to the base of a transistor amplifier 72, the emitter of which is connected to resistor 74 and the collector of which is connected to resistor 76. The output of the transistor amplifier 72 is applied to the emitter follower 78, the output of which is taken from the load resistor 80 and is applied through the coupling capacitor 82 to a clamp network comprising the resistor 84, the diode 86 and the transistor 88. The output of the transistor 88 is applied to a differentiator clipper which includes the diode 90 and resistor 92 having their junction coupled through a capacitor 94 to the junction of a circuit comprised of the diode 96 and resistor 98.

In the operation of the peak detector disclosed in FIGURE 4 and described in detail hereinabove, each pulse received at the input is rectified, amplified, and clamped so that the resultant wave form at the output of the differentiator clipper is a pulse corresponding to the peak of the pulse input.

Reference is made to the composite wave form chart of FIGURE 5 to illustrate the operation of the invention. An illustrative group of data pulses is shown in FIGURE 5(A), and these pulses are present, for example, at the output of the data pulse source 30. The corresponding data pulse writing currents present at the record magnetic head 16 are illustrated at FIGURE 5(C). The clock pulses and their corresponding pulse writing currents are illustrated in FIGURES 5(B) and 5(D) respectively.

Since in accordance with a feature of this invention, as explained above, the clock pulses are recorded on the record medium approximately ½ pulse period after their corresponding data pulses, this staggered or off-set phase relationship is clearly shown in FIGURE 5.

FIGURE 5(E) illustrates the data pulses sensed by the magnetic pick-up head 20 and present in the data pulse playback channel. FIGURE 5(F) illustrates the pulses sensed by the magnetic pick-up head 22 and present in the clock pulse playback channel. It will be noted that the clock pulses in the clock play-back channel occur approximately ½ pulse period after their corresponding data pulses in the data play-back channel due to the staggered or off-set phase relationship of these pulses on the record medium.

The output of the data channel peak detector 52 as applied to the flip-flop 26 is shown in FIGURE 5(G). It will be noted that the output of the data channel peak detector comprises sharp pips corresponding to the pulse peaks of the data pulses applied to the peak detector 52. The output of the clock channel peak detector 56 is shown in FIGURE 5(H) and similarly, it will be noted that the output of the peak detector 56 comprises sharp pips corresponding to the peaks of the clock pulses in the clock channel. Those skilled in the art will now appreciate that the phase relationships of the data pulses and clock pulses at the output of their respective peak detectors remain constant—as shown in FIGURES 5(G) and 5(H)—since these pulses are slaves to the record medium. Accordingly, this phase relationship is not affected adversely by such factors as speed variation in the record medium, by skew of a magnetic tape, or by errors in the delay circuits of the type utilized in the prior art.

It further can be appreciated that each of the sharp pips shown in FIGURE 5(G) serves to set the flip-flop 26 and that each of the sharp pips shown in FIGURE 5(H) serves to reset the flip-flop, if the latter is set by a data pulse. In this manner, the output of the system includes each data pulse recorded to provide an accurate and efficient recording and playback system suitable for use with modern-day, high speed data processing apparatus.

A further illustrative embodiment of the present invention is shown in FIGURES 6 through 9 of the drawing. As explained in greater detail hereinbelow, this particular embodiment is characterized by the in-phase recording of the clock and data pulses in their respective channels upon the magnetizable record medium such that, upon play-back of these pulses, each clock pulse is sensed for its cross-over point rather than for its peak. Those skilled in the art will appreciate that since the cross-over point of each clock pulse occurs approximately at the middle of the corresponding data pulse, each data pulse will be recovered in an accurate fashion despite speed variations or skew factors affecting the record medium.

FIGURE 6 discloses a pulse writing circuit which conveniently may be utilized with this particular embodiment of the invention. FIGURE 6(a) shows a data pulse source 100 which provides a series of data pulses at its output. Conveniently, these data pulses may be transmitted through a suitable buffer or amplifier means 102 to a binary counter flip-flop 104 which is adapted to be set into one or the other of its two stable states of operation in accordance with the characteristics of each data pulse. Thus, the output of the binary counter flip-flop 104 may be in the form of a positive recording current on the output line 106 or a negative recording current on the output line 108 dependent upon the nature of the data pulse to be recorded. These recording currents manifestly may be applied to a suitable magnetic writing or recording head, such as the magnetic head 16 shown in FIGURE 1, to effect the desired recording of the data pulses on the record medium 10.

In a like fashion, the clock pulses may be obtained from a clock pulse source 110 and these pulses are transmitted through suitable amplifying or buffer means 112 to the binary counter flip-flop 114. Binary counter flip-flop 114 may be set to one or the other of its two stable states of operation depending upon the nature of the clock pulses transmitted thereto. Thus, the output of the binary counter flip-flop 114 is in the form of a positive recording current on the output line 116 or a negative recording current on the output line 118, as determined by the state of the flip-flop 114, and this output is applied to a suitable clock pulse writing magnetic head, such as the magnetic head 18 shown in the FIGURE 1 of the drawing.

In accordance with a feature of this particular embodiment of the invention, it is convenient to record the data pulses and clock pulses on the record medium 10 in-phase with each other. Similarly, it is convenient to sense or read the data and clock pulses from their respective channels on the record medium in-phase with each other. This reading or sensing function may be effected by the illustrative circuit shown in FIGURE 7 of the drawing wherein the data pulses are sensed by the magnetic pick-up head 20 adjacent the data channel and the clock pulses are sensed by the magnetic pick-up head 22 adjacent the clock channel.

The data pulses sensed by the pick-up head 20 are transmitted through the amplifier 120 to a peak detector 122 wherein the peak of each sensed data pulse is detected and a corresponding output signal is applied to the bistable flip-flop circuit 124 to set the flip-flop 124 into one of its two stable states of operation. The clock pulses sensed by the pick-up head 22 are transmitted through the amplifier 126 to the cross-over detector 128. The operation of the cross-over detector is to determine the point at which each sensed clock pulse crosses over from one polarity to the other, and to provide a pulse output in-phase with this cross-over point.

Advantageously, the cross-over point for each clock pulse occurs substantially ½ pulse period after the peak of its corresponding data pulse to provide ½ pulse period delay between the outputs of peak detector 122 and cross-over detector 128. Since the data pulse output from peak detector 122 serves to set the flip-flop 124 to one of its two stable states, the delay clock pulse output of cross-over detector 128 at a later time period serves to reset the flip-flop circuit 124 to its first stable state. Those skilled in the art can now appreciate that this time difference between the output of peak detector 122 and cross-over detector 128 ensures the recovery of all of the sensed data pulses for transmission to further utilization circuits in the data processing system.

One illustrative embodiment of cross-over detector is shown in detail in FIGURE 8 of the drawing. Advantageously, this cross-over detector may comprise a transformer 130 having its input winding connected to the output of amplifier 126. The secondary winding of transformer 130 forms a part of a full wave rectifier which includes the diodes 132 and 134 connected to different terminals of the transformer secondary winding. A center tap connected on the transformer secondary winding is connected to a voltage divider network comprised of the resistances 136 and 138 and is further connected through resistance 140 to the base of a transistor emitter follower stage 142. The output of the emitter follower stage 142 is taken across the emitter resistance 144 and is applied to the base of a transistor amplifier stage 146.

The emitter of transistor amplifier stage 146 is connected through resistance 148 to a suitable voltage source and the collector is connected to resistance 150 as well as to the base of the transistor follower amplifier stage 152.

The output from the follower amplifier stage 152 is taken across the emitter resistance 154 and is applied through the coupling condenser 156 to a clamp stage comprised of the resistance 158 connected in series with the diode 160. The junction of resistance 158 and diode 160 of the clamp stage is connected to a peak detector stage comprised of transistor 162 having its collector connected to the parallel circuit of resistance 164 and diode 166. The collector of transistor 162 also is connected through the coupling condenser 168 to the junction of the diode 170 and resistance 172.

In the operation of the cross-over detector described above, each clock pulse sensed from the clock channel of the record medium is rectified, and by the action of the follower, amplifier, and peak detector stages, an output pulse is provided on the output line which occurs in-phase with the cross-over point of each clock pulse. This operation is illustrated in FIGURE 9 of the drawing wherein FIGURES 9(A) and 9(C) represent an illustrative group of data pulses recorded on the record medium by the writing magnetic head 16. FIGURES 9(B) and 9(D) represent the clock pulses recorded on the record medium by the writing head 18. Upon play-back of the data and clock pulses from their respective channels on the record medium, the peak detector 122 transmits the pulses shown in FIGURE 9(E) of the drawing to the flip-flop circuit 124 to cause the flip-flop circuit to be set in response to each data pulse played back.

Clock channel play-back is shown in FIGURE 9(F) of the drawing wherein it can be seen that a sensed clock pulse peak occurs in-phase with the peaks of the corresponding clock pulses recorded on the record medium. As a result of the operation of the cross-over detector 128, each clock pulse peak sensed during play-back is shifted in-phase approximately a ½ pulse period, as illustrated in FIGURE 9(G) of the drawing. Since the cross-over detector output pulses shown in FIGURE 9(G) occur ½ pulse period later than the corresponding data pulses played back, it can be seen that the flip-flop circuit 124 will be reset by the cross-over detector output after each setting of the flip-flop circuit by a data pulse from peak detector 122. The output of the flip-flop circuit 124 is illustrated at FIGURE 9(H) of the drawing wherein it can be seen that an output pulse occurs for each data pulse originally recorded but at a time period approximately ½ pulse period subsequent thereto.

While there have been shown and described, several specific illustrative embodiments of the present invention, it will of course, be understood that various modifications and alternative constructions may be made without departing from the true spirit and scope of the invention. Therefore, the appended claims are intended to cover all such modifications and alternative constructions as fall within their true spirit and scope.

What is claimed as the invention is:

1. In a data processing system of the type having apparatus for writing and reading signals utilizing a magnetizable record medium, the improvement of a dynamically operated record medium having a magnetizable surface for the storage of signal pulses thereon, said record medium being provided with individual clock pulse and data pulse channels, electrically energizable recording means operatively associated with said record medium for recording clock and data pulses on their respective channels in a phase staggered relationship, each of said data pulses being recorded in said data channel a predetermined time period in advance of the recording of its corresponding clock pulse in said clock channel, a first play-back network for reading data pulses from said data channel and having a pulse output only in response to the detection of the peaks of said data pulses, a bistable circuit having two stable states of operation, said first play-back network having its output connected to said bistable circuit for setting said bistable circuit in one stable state each time a data pulse peak is detected, and a second play-back network for reading the clock pulses from said clock channel and having an output connected to said bistable circuit for resetting said bistable circuit into its other stable state upon detection of a clock pulse peak.

2. In a data processing system of the type having apparatus for writing and reading signals utilizing a magnetizable record medium, the improvement of a dynamically operated record medium having a magnetizable surface for the storage of signal pulses thereon, said record medium being provided with individual clock pulse and data pulse channels, electrically energizable recording means operatively associated with said record medium for recording clock and data pulses in a phase-staggered relationship on their respective channels, each data pulse being recorded a predetermined time period in advance of its corresponding clock pulse, a first play-back network for reading data pulses from the data channel comprising a magnetic pick-up head adjacent said data channel, peak detector means having an output only in response to the detection of the peaks of said data pulses, a bistable circuit having two stable states of operation, said peak detector having its output connected to said bistable circuit for setting said bistable circuit in one stable state each time a data pulse peak is detected, and a second play-back network for reading the clock pulses from the clock channel comprising a magnetic pick-up head adjacent said clock channel, and peak detector means having its input connected to the last-named magnetic pick-up head and having its output connected to said bistable circuit for resetting said bistable circuit into its other stable state only upon detection of the peaks of said clock pulses.

3. In a data processing system of the type having apparatus for writing and reading signals utilizing a magnetizable record medium, the improvement of a dynamically operated record medium having a magnetizable surface for the storage of signal pulses thereon, said record medium being provided with individual clock pulse and data pulse channels, electrically energizable recording means operatively associated with said record medium for recording clock and data pulses in a phase-staggered relationship on their respective channels, a bistable circuit having two stable states of operation, a first play-back network for reading data pulses from said data channel and for applying an output only in response to the detection of the peaks of said data pulses to said bistable circuit for setting said bistable circuit in one stable state each time a data pulse peak is detected, and a second play-back network for reading the clock pulse from the clock channel and for applying an output only in response to the detection of the peaks of said clock pulses to said bistable circuit for resetting said bistable circuit into its other stable state.

4. In a data processing system of the type having apparatus for writing and reading signals utilizing a magnetizable record medium, the improvement of a dynamically operated record medium having a magnetizable surface for the storage of signal pulses thereon, said record medium being provided with individual clock pulse and data pulse channels, electrically energizable recording means operatively associated with said record medium for recording data pulses on their respective channels and for recording clock pulses on their respective channels approximately ½ pulse period after their corresponding data pulses, a first play-back network for reading data pulses from the data channel on said record medium, said first play-back network comprising a magnetic pick-up head adjacent said data channel, peak detector means providing an output only in response to the detection of the peaks of said data pulses, a bistable circuit having two stable states of operation, said peak detector having its output connected to said bistable circuit for setting said bistable circuit in one stable state each time a data pulse peak is detected, and a second play-back network for reading the clock pulses from the clock channel of said record medium, said second play-back network comprising a magnetic pick-up head adjacent said clock channel, and detector means having its input connected to the last-named magnetic pick-up head and having its output connected to said bistable circuit for resetting said bistable circuit into its other stable state upon the detection of a sensed characteristic of said clock pulses.

5. In a data processing system of the type having apparatus for writing and reading signals utilizing a magnetizable record medium, the improvement of a dynamically operated record medium having a magnetizable surface for the storage of signal pulses thereon, said record medium being provided with individual clock pulse and data pulse channels; electrically energizable recording means operatively associated with said record medium for recording clock and data pulses on their respective channels in phase-staggered relationship; a first play-back network for reading data pulses from the data channel on said record medium, said first play-back network comprising a magnetic pick-up head adjacent said data channel, first peak detector means providing an output only in response to the detection of the peaks of said data pulses; a bistable circuit having two stable states of operation; said first peak detector having its output connected to said bistable circuit for setting said bistable circuit in one stable state each time a data pulse peak is detected; a second play-back network for reading the clock pulses from the clock channel of said record medium, said second play-back network comprising a magnetic pick-up head adjacent said clock channel, second peak detector means having its input connected to the last-named magnetic pick-up head and only providing an output in response to the detection of the peaks of said clock pulses, said output being connected to said bistable circuit for resetting said bistable circuit into its other stable state, and gating circuit means connected to the outputs of said first and second playback networks for providing an output in response to the sensing of pulses from the data and clock channels.

6. In a data processing system, the improved method of writing and reading signals utilizing a dynamically operated magnetizable record medium, comprising the steps of recording data signals on a data signal channel of said record medium, recording clock pulses on a clock pulse channel of said record medium with each clock pulse being recorded substantially ½ pulse period after the recording of its corresponding data pulse, reading data pulses from the data channel on said record medium by a magnetic pick-up head adjacent said data channel, and setting a bistable circuit in one of its stable states each time a data pulse peak is read, reading clock pulses from the clock channel of said record medium by a magnetic pick-up head adjacent said clock channel, resetting said bistable circuit into its other stable state each time a clock pulse is read after a data pulse has been read, and providing an output pulse from said bistable circuit each time it is reset to represent each data pulse recorded on said record medium.

7. In a data processing system of the type having apparatus for writing and reading signals utilizing a magnetizable record medium, the improvement of an elongated magnetic tape having a magnetizable surface for the storage of signal pulses thereon, said record medium being provided with individual clock pulse and data pulse channels, electrically energizable recording means operatively associated with said record medium for simultaneously recording clock and data pulses on their respective channels, a first play-back network for reading data pulses from the tape data channel comprising peak detector means for providing an output only in response to the detection of the peaks of said data pulses, a bistable circuit having two stable states of operation, said peak detector having its output connected to said bistable circuit for setting said bistable circuit in one stable state in response to the detection of a data pulse peak, a second play-back network for reading the clock pulses from the tape clock channel and cross-over detector means having its input connected to said second play-back network and having its output connected to said bistable circuit for resetting said bistable circuit into its other stable state in response to the detection of a clock pulse cross-over from one polarity to another.

References Cited by the Examiner

UNITED STATES PATENTS

| | | | |
|---|---|---|---|
| 2,796,596 | 6/1957 | Kenosian | 340—174.1 |
| 2,903,677 | 9/1959 | Curtis | 340—174.1 |
| 2,907,989 | 10/1959 | Guerber | 340—174.1 |
| 2,972,736 | 2/1961 | Hersh | 340—174.1 |
| 3,076,183 | 1/1963 | Willoughby | 340—174.1 |

IRVING L. SRAGOW, *Primary Examiner.*

M. K. KIRK, A. I. NEUSTADT, *Assistant Examiners.*